(12) United States Patent
Ye

(10) Patent No.: US 8,042,391 B2
(45) Date of Patent: Oct. 25, 2011

(54) INERTIA SENSING MODULE

(75) Inventor: Zhou Ye, Taipei (TW)

(73) Assignee: CyWee Group Limited, Tortola (VG)

( * ) Notice: Subject to any disclaimer, the term of this patent is extended or adjusted under 35 U.S.C. 154(b) by 480 days.

(21) Appl. No.: 12/285,192

(22) Filed: Sep. 30, 2008

(65) Prior Publication Data
US 2010/0077857 A1    Apr. 1, 2010

(51) Int. Cl.
G01P 1/02 (2006.01)
G01P 15/00 (2006.01)

(52) U.S. Cl. ............................................ 73/493; 73/511

(58) Field of Classification Search ................... 73/493, 73/510–511, 431, 514.16, 488–489, 495; 702/141; 345/156–158, 162, 173; 463/36–37
See application file for complete search history.

(56) References Cited

U.S. PATENT DOCUMENTS

| | | | |
|---|---|---|---|
| 7,626,541 B2 * | 12/2009 | Bye | 342/357.57 |
| 2003/0174125 A1 * | 9/2003 | Torunoglu et al. | 345/168 |
| 2008/0030458 A1 * | 2/2008 | Helbing et al. | 345/156 |
| 2009/0104993 A1 * | 4/2009 | Ye | 463/39 |
| 2009/0133499 A1 * | 5/2009 | Cato | 73/514.16 |
| 2009/0262074 A1 * | 10/2009 | Nasiri et al. | 345/158 |
| 2009/0280860 A1 * | 11/2009 | Dahlke | 455/556.1 |
| 2009/0298590 A1 * | 12/2009 | Marks et al. | 463/37 |

* cited by examiner

*Primary Examiner* — Helen C Kwok

(74) *Attorney, Agent, or Firm* — Winston Hsu; Scott Margo

(57) ABSTRACT

An inertia sensing module is connected to a portable electronic device. The inertia sensing module includes an accelerometer unit for generating at least one of acceleration sensing signals $a_x$, $a_y$, $a_z$ corresponding to the directions of X, Y, Z respectively; a gyroscope unit for generating at least one of angular rate sensing signals $\omega_x$, $\omega_y$, $\omega_z$ corresponding to the axes of X, Y, Z respectively; and a connector module having a plug that is inserted into a docking connector of the portable electronic device. With the inertia sensing module being connected to or disconnected from the portable electronic device, a user can control a specific cursor or graphic user interface on a picture of an electronic game player via his/her own motions.

1 Claim, 2 Drawing Sheets

INERTIA SENSING MODULE

BACKGROUND OF THE INVENTION

1. Field of the Invention

The present invention relates to an inertia sensing module, and in particular to an inertia sensing module connected to a portable electronic device.

2. Description of Related Art

When a conventional inertia sensing element is used to sense the motions of a user in order to operate a cursor on a display screen, the user has to wear or hold the inertia sensing element to generate some motions, such as inclining, swinging or rhythmic motions. In this way, the inertia sensing element can sense these motions to generate corresponding signals.

On the other hand, with the fast development of electronic technology, many portable electronic devices or handheld devices such as a mobile communication device (mobile phone), personal digital assistant, satellite navigation device, or smart phone have been made more compact with a reduced weight. Further, these current portable electronic devices are each equipped with a high-performance microprocessor control unit. For example, in order to carry more software tools or multi-media functions, a mobile phone or personal digital assistant is usually provided with a high-performance microprocessor control unit to process data. Furthermore, such a portable electronic device usually comprises a wireless transmission device such as Bluetooth to exchange data signals.

However, since a later stage of 1980s, graphic user interfaces were well-developed and widely used in various electronic products, such as a desktop computer, notebook computer, mobile communication device, personal digital assistant, satellite navigation device or the like, thereby providing a convenient, user-friendly, and quick manner of operation for the user. However, when the user uses a graphic user interface to operate a computer system or interact with the computer system, a keyboard, mouse, touch panel or other devices also has to be used to input signals, which becomes the restriction of the development of the graphic user interface. Furthermore, it cannot provide an operating environment for simulating the actual situations.

In the graphic user interface operated by means of sensing the motions of the user, the user still has to wear or use some specific input devices, such as a handle, remote controller or the like. Usually, based on the motions of the user, these input devices can generate sensing signals, and then the sensing signals are transmitted to a computer system. After a series of processes such as decoding, conversion, calculation or the like, control signals can be generated. Such a complicated process cannot respond to the specific motions of the user very accurately, so that the control of the graphic user interface of the portable electronic device or computer system and a specific cursor on a display of an electronic game player will not respond to the motions of the user sensitively or even may delay.

Consequently, because of the above limitation resulting from the technical design of prior art, the inventor strives via real world experience and academic research to develop the present invention, which can effectively improve the limitations described above.

SUMMARY OF THE INVENTION

The object of the present invention is to provide an inertia sensing module connected to a portable electronic device, whereby the functions of a microprocessor control unit and a wireless signal transmission module in the portable electronic device can be combined with each other to generate and output control signals corresponding to the motions of the user.

In order to achieve the above objects, the present invention provides an operating device of a graphic user interface, which includes an inertia sensing module connected to a portable electronic device, the portable electronic device comprising a docking connector, a microprocessor control unit (MCU) and a wireless signal transmission unit; the inertia sensing module comprising an accelerometer unit for generating at least one of acceleration sensing signals $a_x$, $a_y$, $a_z$ corresponding to the directions of X, Y, Z respectively when subjected to accelerations in the directions of X, Y, Z; a gyroscope unit for generating at least one of angular rate sensing signals $\omega_x$, $\omega_y$, $\omega_z$ corresponding to the rotational axes X, Y, Z, respectively when subjected to angular rates along the rotational axes X, Y, Z; and a connector module having a plug that is inserted into the docking connector of the portable electronic device. With the plug of the connector module being inserted into the docking connector, the inertia sensing module and the portable electronic device are combined with each other to achieve an electrical connection therebetween. The microprocessor control unit receives the at least one of acceleration sensing signals generated by the accelerometer unit and the at least one of angular rate sensing signals generated by the gyroscope unit, and then converts these acceleration sensing signals and angular rate sensing signals into digital sensing signals. After an operation process, the digital sensing signals are converted into various control signals. Via the wireless signal transmission unit of the portable electronic device, the control signals are outputted to control a specific cursor or graphic user interface on a display of an electronic game player.

The present invention has advantageous features as follows.

(I) With the inertia sensing module being connected to or disconnected from the portable electronic device conveniently, it is not necessary for the user to use additional inputting devices such as a keyboard, mouse, touch panel, rocker or the like. The user can use a portable electronic device such as a mobile phone in cooperation with the inertia sensing module to operate an electronic game player or graphic user interface via his/her own motions.

(II) Since many portable electronic devices are equipped with a high-performance microprocessor control unit and a wireless signal transmission module, the microprocessor control unit can be used to perform the operational process of the sensing signals, and the wireless signal transmission module can be used to output the digital operating signals. Therefore, the complexity of the circuit and structure within the inertia sensing module can be substantially reduced, thereby generating a very compact inertia sensing module that can be carried, stored or inserted into the portable electronic device by the user conveniently.

In order to further understand the characteristics and technical contents of the present invention, a detailed description relating thereto will be made with reference to the accompanying drawings. However, the drawings are illustrative only, but not used to limit the scope of the present invention.

DETAILED DESCRIPTION OF PREFERRED EMBODIMENTS

Figure 1:
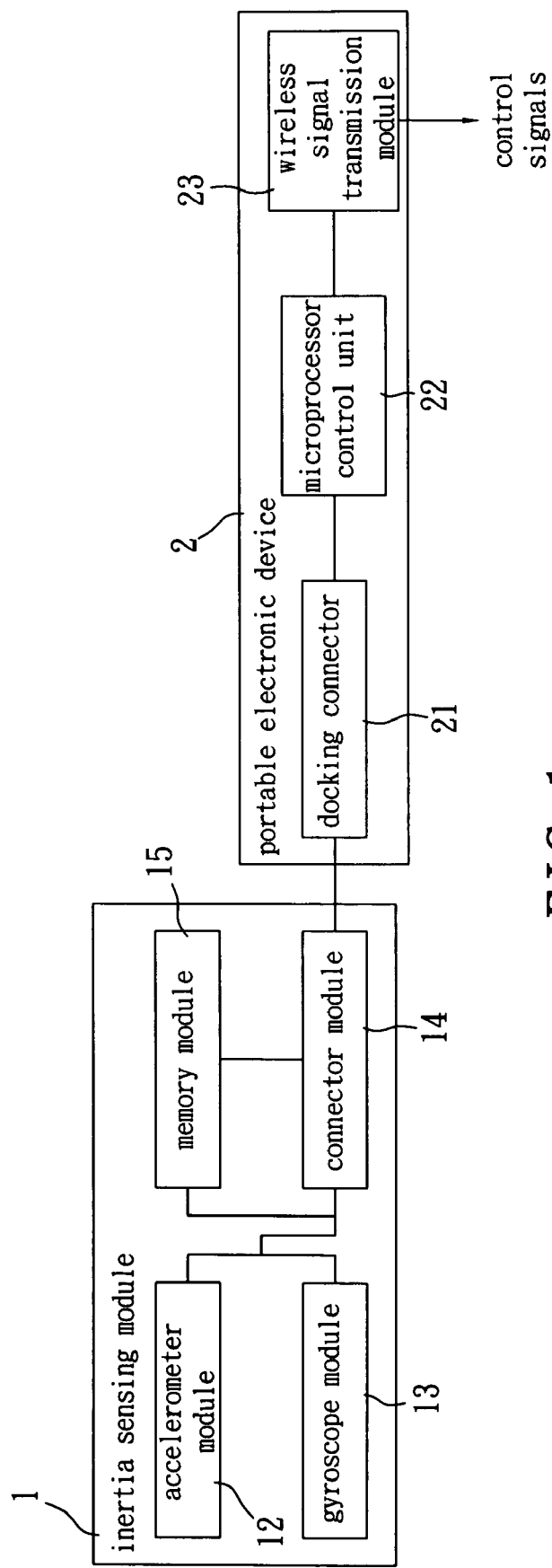
FIG. 1 is a block view showing the constitution of an embodiment of the inertia sensing module of the present invention.
Figure 2:
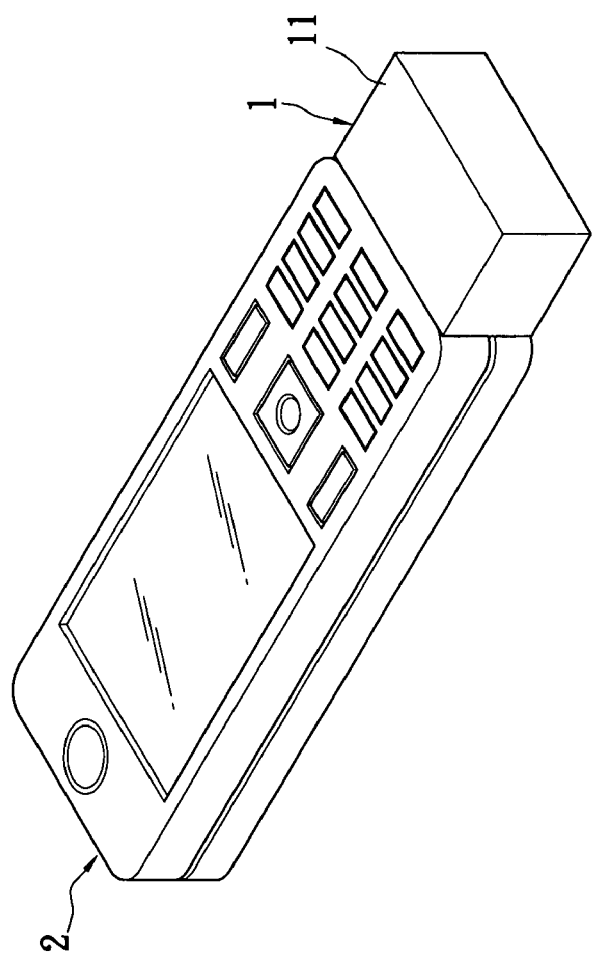
FIG. 2 is an assembled perspective view showing the embodiment of the inertia sensing module of the present invention.
Figure 3:
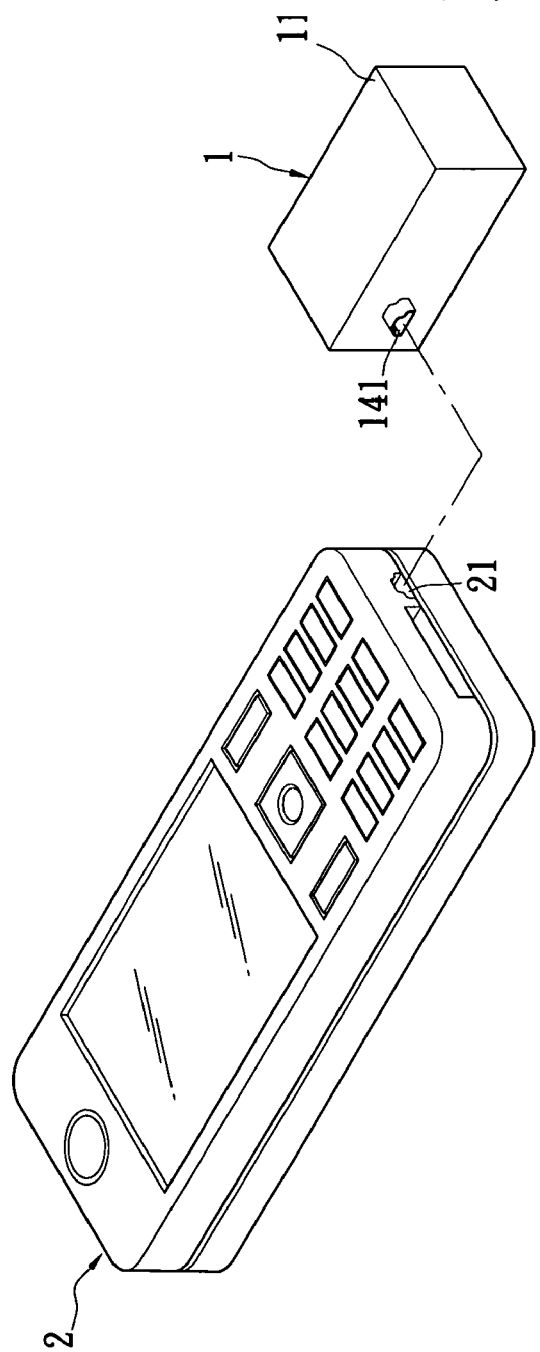
FIG. 3 is an exploded perspective view showing the embodiment of the inertia sensing module of the present invention.

Please refer to FIGS. 1 to 3. FIG. 1 is a block view showing the constitution of an embodiment of the inertia sensing module of the present invention. FIG. 2 and FIG. 3 are an assembled perspective view and an exploded perspective view showing the embodiment of the inertia sensing module of the present invention, respectively. The inertia sensing module 1 can be connected to a portable electronic device 2, such as a mobile phone or personal digital assistant (PDA). The portable electronic device 2 is equipped with a docking connector 21, a microprocessor control unit 22 and a wireless signal transmission module 23. In the present embodiment, the inertia sensing module 1 includes a casing 11, an accelerometer module 12, a gyroscope module 13, a connector module 14 and a memory module 15.

The accelerometer module 12 is disposed in the casing 11 for generating at least one of acceleration sensing signals $a_x$, $a_y$, $a_z$ corresponding to the directions of X, Y, Z respectively when subjected to accelerations in the directions of X, Y, Z.

The gyroscope module 13 is also disposed in the casing 11 for generating at least one of angular rate sensing signals $\omega_x$, $\omega_y$, $\omega_z$ corresponding to the rotational axes X, Y, Z, respectively when subjected to angular rates along the rotational axes X, Y, Z.

The accelerometer module 12 and the gyroscope module 13 are made by means of a micro electronic mechanic system (MENS) process, and can be a capacitor module, piezoelectric module or an optical module. In the present embodiment, the accelerometer module 12 and the gyroscope module 13 are preferably capacitor modules because they have a lower manufacture cost and good sensitivity.

The connector module 14 is also disposed in the casing 11 and is electrically connected with the accelerometer module 12 and the gyroscope module 13. The connector module 14 has a plug 141. The plug 141 protrudes from the casing 11, so that it can be inserted into a docking connector 21 of the portable electronic device 2. With the plug of the connector module being inserted into the docking connector, the inertia sensing module 1 and the portable electronic device 2 are combined with each other to achieve an electrical connection therebetween. In the present embodiment, the connector module 14 and the docking connector 21 are a plug and a socket for a mini USB.

According to the above embodiment, when the inertia sensing module 1 and the portable electronic device 2 are combined with each other, they form a handle for the user's grip. The handle serves as an inputting device for control signals. Via motions of the user such as the swinging of hands, the accelerometer module 12 and the gyroscope module 13 disposed in the inertia sensing module 1 generate at least one of acceleration sensing signals $a_x$, $a_y$, $a_z$ corresponding to the directions of X, Y, Z respectively when subjected to accelerations in the directions of X, Y, Z and at least one of angular rate sensing signals $\omega_x$, $\omega_y$, $\omega_z$ corresponding to the rotational axes X, Y, Z, respectively when subjected to angular rates along the rotational axes X, Y, Z.

The microprocessor control unit 22 of the portable electronic device 2 is connected to the docking connector 21 via the connector module 14, and it receives the acceleration sensing signals and the angular rate sensing signals from the inertia sensing module 1. Then, the microprocessor control unit 22 converts these acceleration sensing signals and angular rate sensing signals into digital sensing signals. The digital sensing signals are converted into various control signals following an operation process. Via the wireless signal transmission module 23 of the portable electronic device, the control signals are outputted to control a specific cursor or graphic user interface on a display of an electronic game player.

The memory module 15 is disposed in the casing 11. The memory module 15 continuously receives, records and stores the acceleration sensing signals generated by the accelerometer unit 12 and the angular rate sensing signals generated by the gyroscope unit 13 or the digital sensing signals generated by the microprocessor control unit 22, thereby acting as a signal database for recording the motions of a user. Furthermore, the signal database can be used to generate a parameter to finely adjust the acceleration sensing signals, the angular rate sensing signal or the digital sensing signals, thereby improving the reaction and sensitivity to control.

For example, the acceleration sensing signals, the angular rate sensing signal or the digital sensing signals recorded in the memory module 15 can be compared with a set of reference signals that are provided in advance. The reference signals correspond to various control signals, such as controlling a specific cursor on a display of an electronic game player to move upwards, downwards, leftwards or rightwards, or selecting or exiting a graphic user interface. In this way, the memory module 15 can classify the acceleration sensing signals, the angular rate sensing signal, the digital sensing signals or the combination thereof based on the reference signals. Further, the memory module 15 uses the recorded signals of the same classification to generate a new characteristic signals so as to modify the reference signals. In this way, the sensitivity of the control signals can be improved according to the motion habit of a user. Preferably, in the present embodiment, the memory module 15 can store a plurality of motion habits of a plurality of users.

According to the above, the inertia sensing module 1 of the present invention has advantageous features as follows.

(I) Since the inertia sensing module 1 can be connected to or disconnected from the portable electronic device 2 conveniently, it is not necessary for the user to use additional inputting devices such as a keyboard, mouse, touch panel, rocker or the like. The user can operate an electronic game player or graphic user interface via his/her own motions.

(II) Since many portable electronic devices 2 are each equipped with a high-performance microprocessor control unit 22 and a wireless signal transmission module 23, the microprocessor control unit 22 can be used to perform the operational process of the sensing signals, and the wireless signal transmission module 23 can be used to output the digital operating signals. Therefore, the complexity of the circuit and structure within the inertia sensing module 1 can be reduced greatly, thereby generating a very compact inertia sensing module that can be carried, stored or inserted into the portable electronic device 2 by the user conveniently.

(III) Since the memory module 15 is used to record the motion habit of a user, not only the output of the sensing signals can be finely adjusted to improve the reaction and sensitivity to the control, but also the inertia sensing module 1 can generate a personal controlling effect based on the habit of the user.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An inertia sensing module connected to a portable electronic device, the portable electronic device comprising a docking connector, a microprocessor control unit (MCU) and a wireless signal transmission unit, the inertia sensing module comprising:

an accelerometer unit for generating at least one of acceleration sensing signals $a_x$, $a_y$ and $a_z$, corresponding to the directions X, Y, Z respectively, when the accelerometer unit is subjected to accelerations in the directions X, Y and Z;

a gyroscope unit for generating at least one of angular rate sensing signals $\omega_x$, $\omega_y$, $\omega_z$ corresponding to the rotational axes X, Y, Z, respectively, when subjected to angular rates along the rotational axes X, Y, Z; and a connector module having a plug that is mechanically inserted into and electrically connecting to the docking connector of the portable electronic device; and a memory module, electrically connected to the accelerometer unit and the gyroscope unit for receiving and storing the acceleration, angular rate sensing signals, and at least one of motion habits for different users;

thereby the plug of the connector module is mechanically and electrically connected to the docking connector for transmitting the acceleration and angular rate sensing signals between the memory module of the inertia sensing module and the portable electronic device;

the microprocessor control unit receives the at least one of acceleration sensing signals generated by the accelerometer unit and the at least one of angular rate sensing signals generated by the gyroscope unit, converts these acceleration sensing signals and angular rate sensing signals into digital sensing signals, and generates control signals based on the digital sensing signals, and improves sensitivity of the control signals by the motion habits of different users;

the control signals are outputted in order to control a cursor or graphic user interface on a display of an electronic game player via the wireless signal transmission unit of the portable electronic device.

* * * * *